United States Patent

[11] 3,539,039

[72] Inventor Howard E. Chana
   Flint, Michigan
[21] Appl No. 771,455
[22] Filed Oct. 29, 1968
[45] Patented Nov. 10, 1970
[73] Assignee General Motors Corporation
   Detroit, Michigan
   a corporation of Delaware

[54] TRANSMISSION OUTPUT SHAFT BRAKE MECHANISM
   5 Claims, 5 Drawing Figs.
[52] U.S. Cl. .................................................. 192/4
[51] Int. Cl. ......................................... F16h 57/10
[50] Field of Search ......................................... 192/4;
   74/753; 188/69

[56] References Cited
UNITED STATES PATENTS

| | | | |
|---|---|---|---|
| 2,875,856 | 3/1959 | Mrlik et al. | 192/4X |
| 3,074,513 | 1/1963 | Robinson | 192/4X |
| 3,187,846 | 6/1965 | Powell | 188/69 |
| 3,300,001 | 1/1967 | Stockton | 192/4 |

Primary Examiner—Arthur T. McKeon
Attorney—E. W. Christen, A. M. Heiter and D. F. Scherer ABSTRACT: A planetary gear transmission in which a plurality of forward and reverse drive ratios are obtainable. Reverse drive ratio is obtained by operating a fluid motor to engage a disc brake which is connected to one member of the planetary gearing. The fluid motor has an annular chamber formed in the rear wall of the transmission housing and an annular piston having a cylindrical extension engaging a nonrotating disc of the disc brake and an integral key which maintains the piston nonrotatable relative to the transmission housing. Another member of the planetary gearing is connected to the output shaft and surrounded by the extension. The extension has a window or opening permitting a parking pawl to pass therethrough. The parking pawl is pivotally mounted in the transmission housing and is operated by a mechanical linkage so that the pawl can be urged into and out of engagement with a park gear located on the periphery of the planetary gear member connected to the output shaft. When the pawl is engaged, the output shaft is operatively connected to the transmission housing thus preventing rotation of the output shaft.

INVENTOR.
Howard E. Chana
BY
A. M. Heiter
ATTORNEY

INVENTOR.
Howard E. Chana
BY
a. M. Heiter
ATTORNEY

TRANSMISSION OUTPUT SHAFT BRAKE MECHANISM

This invention relates to brake mechanisms and more particularly to parking brake mechanisms in planetary gear transmissions.

Many of the planetary transmissions being produced at this time are using disc type friction brakes for restraining the reaction members of the planetary gear sets instead of the band type brake. The disc type brake improves the smoothness of operation of a transmission by permitting more relative rotation between the reaction member and the stationary housing during engagement of the brake. This type of brake also permits simpler controls and construction. However, when disc type brakes are located circumjacent the output member of the transmission, there is no space available for a park gear, which is used to hold the vehicle stationary, unless the overall length of the transmission is increased. Transmission length is an important factor in vehicle design and passenger comfort, since the front floor pan of the vehicle must be raised to make room for the transmission.

The present invention provides a park brake mechanism adapted for use with a disc-type brake which does not increase the overall length of the transmission. This is accomplished by providing a park gear on the periphery of the output member of the planetary gear set, a park pawl mounted on the transmission housing and a window opening in the piston of the disc brake through which the pawl extends to engage the park gear.

It is, therefore, an object of this invention to provide a park brake having a pawl which extends through a window in a brake piston to engage a park gear on the transmission output member.

Another object of this invention is to provide in a transmission having input and output shafts operatively connected by multi-ratio planetary gearing and ratio control means, an improved parking brake mechanism including a park pawl pivotally mounted in the transmission housing and extending through a piston of the ratio control means, a park gear on the output member of the planetary gearing surrounded by the piston, and a cam member to selectively engage the park pawl with the park gear.

These and other objects and advantages will become more apparent from the following description and drawings in which.

Figure 1:
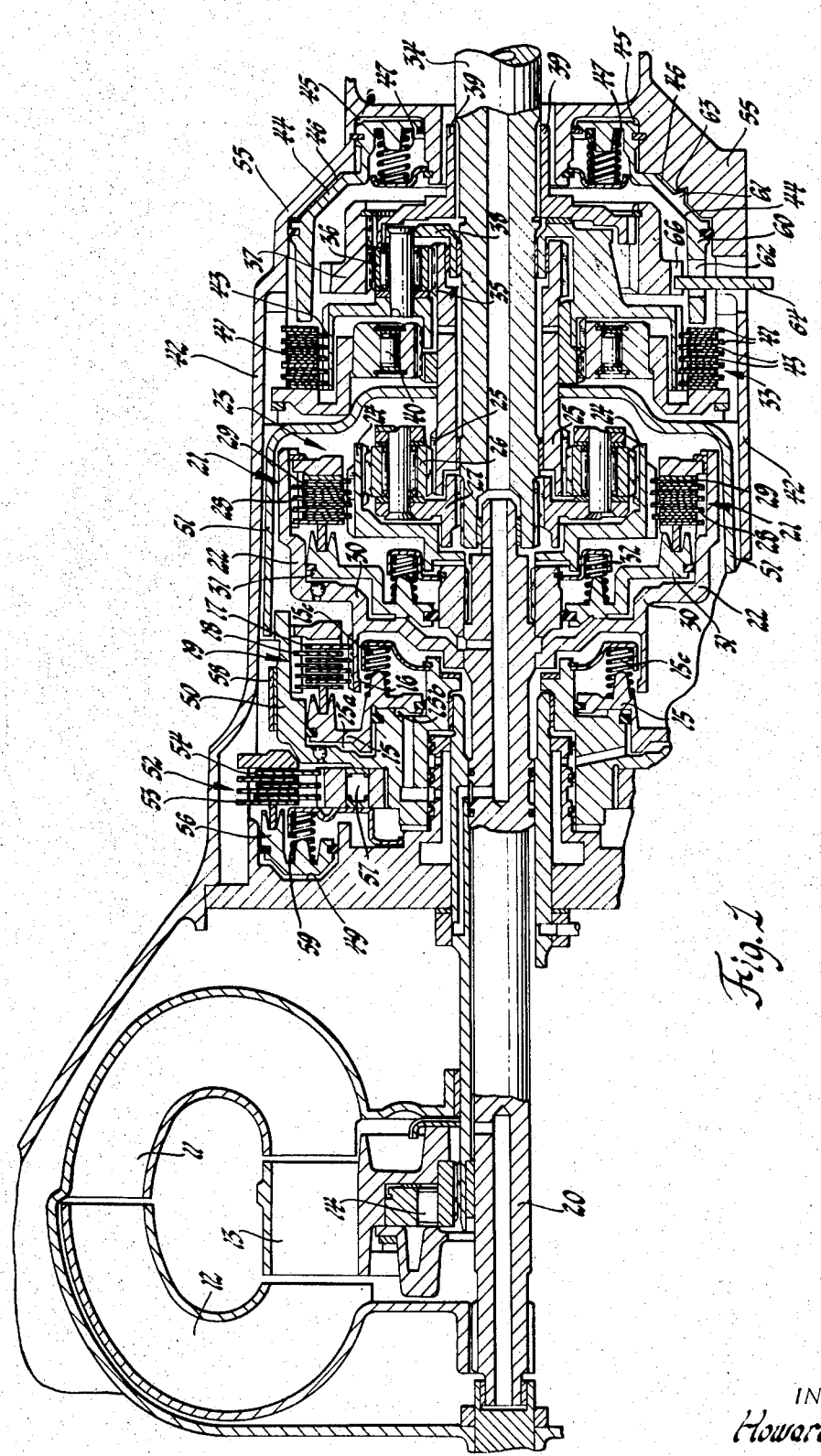
FIG. 1 is a cross-sectional view of a transmission.

Referring to the drawings, wherein like characters represent like or corresponding components, there is shown a transmission including an engine driven torque converter having an engine driven impeller 11, a turbine 12 and a reactor member 13. A one-way brake 14 prevents reverse rotation of reactor member 13 and permits forward rotation of the same. A transmission power input shaft 20 driven by turbine 12 drives a clutch drum 22 of a forward drive clutch 21 and a clutch hub 16 of a direct drive and reverse clutch 19. A forward gear unit 23 includes a ring gear 24 and a sun gear 25 in mesh with a planet pinion 26 supported in a carrier 27 splined to a power output shaft 34. Drive clutch discs 28 on drum 22 are adapted to engage driven clutch discs 29 and ring gear 24 upon admission of fluid pressure to a fluid servo or motor 30 formed by the clutch drum 22 and a servo piston 31. A release spring 32 biases piston 31 toward its clutch release position.

A rear planetary gearing unit includes a sun gear 35 and a ring gear 37 in mesh with a planet pinion 36 supported in a carrier 38. Sun gear 35 is integral with sun gear 25 and ring gear 37 is fixed for rotation with output shaft 34 by a hub connection 39. A one-way brake 40 prevents rotation of planet carrier 38 in one direction and permits rotation of carrier 38 in the opposite direction. A disc brake 33, including discs 41 on housing 42 and discs 43 on carrier 38, may be engaged to prevent rotation of carrier 38 in either direction. Brake 33 is engaged when operating in reverse and low range forward operation. A dual piston 44 for actuating brake 33 is reciprocably mounted in two separate servo or motor chambers 45 and 46 of different areas formed in the rear wall 55 of the transmission housing 42. The piston 44 and chambers 45 and 46 cooperate to form a fluid motor. The smaller chamber 45 is adapted to receive fluid pressure when operating in low range and both chambers 45 and 46 are supplied with fluid when operating in reverse. The arrangement provides for smooth application of brake 33 when shifting into low range operation and also assures adequate brake capacity to handle the torque when shifting into reverse. A spring 47 biases the piston 44 toward the brake release position.

A drum 50 connected for rotation as a unit with sun gears 25 and 35, by a connector 51, is adapted to be braked against rotation in one direction by a second gear disc brake 52 and a one-way brake 57 in series. Disc brake 52, which includes brake discs 53 and 54, may be engaged by a piston 56 upon admission of fluid under pressure to servo chamber 49 which cooperates with the piston 56 to form a fluid motor. A spring 59 yieldably biases piston 56 to its brake release position. With brake 52 engaged, sun gears 25 and 35 are locked against rotation in one direction and are permitted to rotate in the opposite direction by one-way brake 57. A second gear overrun brake band 58 may, at times be applied to drum 50 to prevent rotation of sun gears 25 and 35 in either direction, particularly for engine braking during coasting.

A direct drive and reverse clutch 19 includes drive clutch discs 17 on clutch hub 16 and driven clutch discs 18 on drum 50. Discs 17 and 18 are energized by a fluid motor comprised of a piston 15 and two servo chambers 15a or 15b. The chamber 15b is supplied with pressure to engage clutch 19 when operating in reverse. A spring 15c biases piston 15 towards its clutch release position.

For neutral operation, brake 52, clutches 19 and 21, and brake 33 are released. For first gear drive, forward drive clutch 21 is engaged. For second gear drive, second gear brake 52 and clutch 21 are engaged. Overrun brake band 58 may also be applied in second gear. For direct drive, clutches 19 and 21 are engaged. For reverse drive, clutch 19 and brake 33 are engaged.

The servos for the various clutches and brakes of this transmission are fluid operated. A suitable fluid system for controlling the operation of these servos is set forth in U.S. Pat. application Ser. No. 811,439 which is also assigned to the present assignee.

Figure 2:
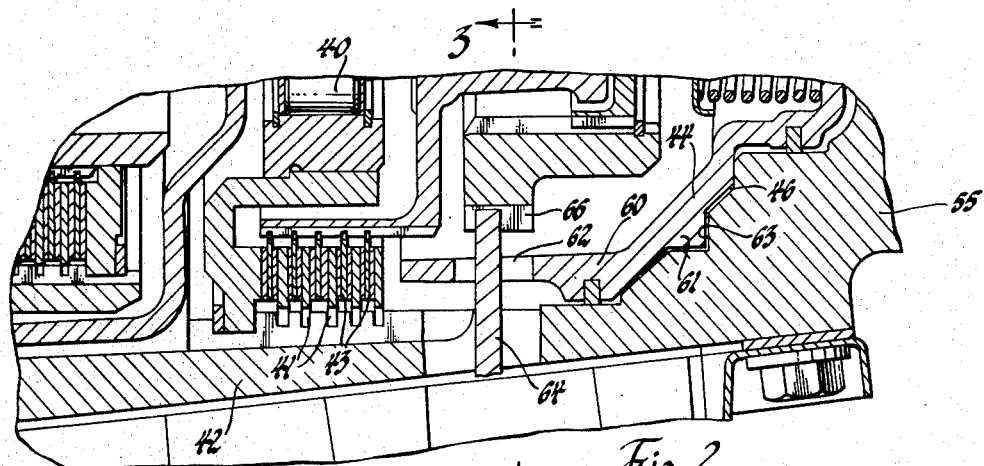
FIG. 2 is an enlarged portion of FIG. 1.
Figure 4:
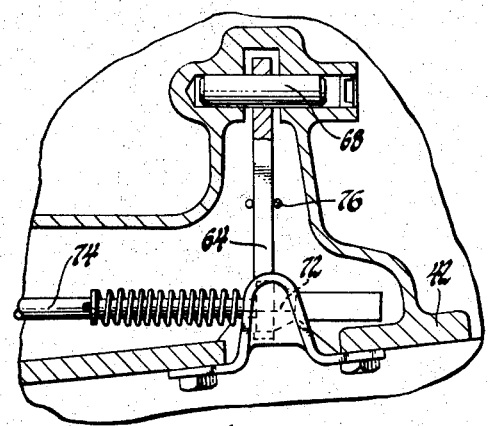
FIG. 4 is an end view of the invention taken along line 4–4 of FIG. 3.
Figure 3:
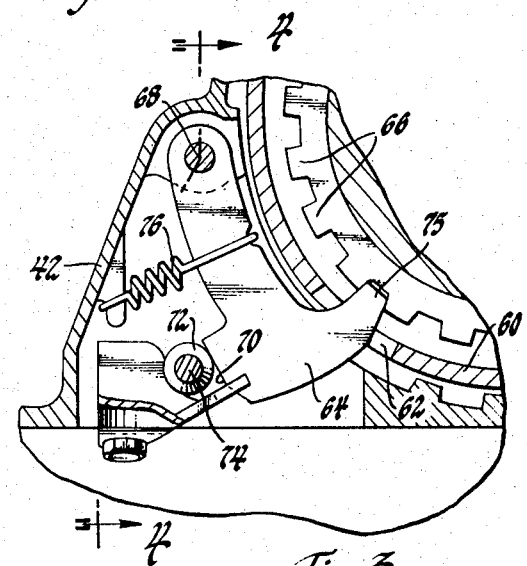
FIG. 3 is a plan view partly in section of the invention taken along line 3–3 of FIG. 2.
Figure 5:
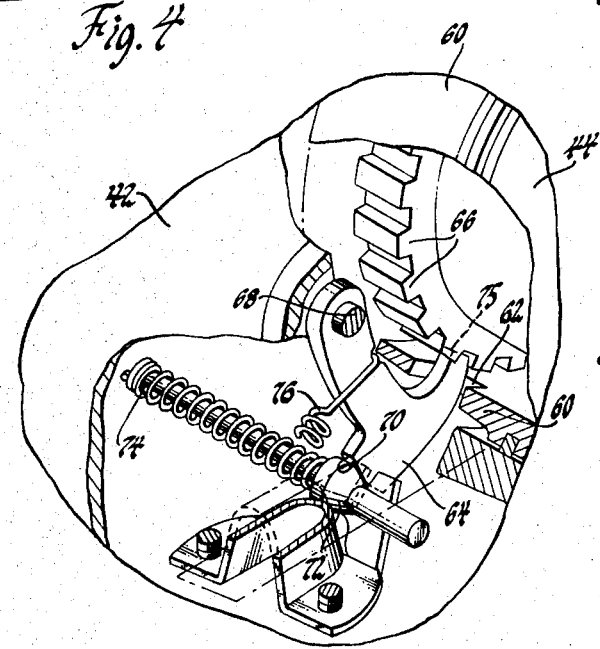
FIG. 5 is an isometric view of the invention.

As seen in FIGS. 1 and 2, the piston 44 has an annular cylindrical extension 60 surrounding the ring gear 37. A window opening 62 is located in the extension 60. A triangular key 61 is formed integral with the piston 44 and is located in a triangular slot 63 formed in the rear wall 55 of the housing 42. The key 61 and slot 63 cooperate to prevent rotation of the piston 44 relative to the housing 42. Thus, the window opening 62 does not change in angular position relative to the housing 42. A parking pawl 64 extends through the window 62 to selectively engage a parking gear 66 formed on the outer perimeter of the ring gear 37. The parking pawl 64, as seen in FIGS. 3, 4 and 5, is rotatably mounted on a pin 68 which is secured to the transmission housing 42. The parking pawl 64 has a cam surface 70 which is engaged by a cam 72 formed on an operator rod 74 and a finger portion 75 which engages the parking gear 66. The cam 72 and operator rod 74 are manipulated by a conventional transmission shift linkage, not shown, to urge the parking pawl 64 into engagement with a parking gear 66. When the cam 72 does not engage the cam surface 70, a tension spring 76 urges the parking pawl 64 out of engagement with the parking gear 66. Thus, when the parking pawl 64 is engaged with the parking gear 66, the output shaft 34 is operatively connected to the transmission housing 42 thereby preventing rotation of the output shaft 34. The parking brake mechanism comprised of the cam 72, the parking pawl 64 and parking gear 66, located circumjacent the reverse brake mechanism, permits a reduction in the overall length of the transmission.

It should be understood that the foregoing description and drawings are for illustrative purposes and are not intended as limitations since obvious modifications will be readily apparent to those skilled in the art.

I claim:

1. In a transmission of the type having a housing, an input shaft and an output shaft, planetary gearing means for providing drive ratios between said shafts, means for controlling the drive ratios including fluid pressure responsive brakes and clutches adapted to be engaged and released and fluid pressure responsive servo mechanism for engaging and releasing said brakes and clutches, one element of said gearing being fixed for rotation with said output shaft, an opening through one of said fluid pressure responsive servos, a pawl pivotally mounted on said housing and extending through said opening, and means for engaging said pawl and said gearing element to prevent rotation of said output shaft.

2. In a transmission of the type having a housing, an input shaft and an output shaft supported for rotation in said housing, means including planetary gearing for establishing different drive ratios between said shafts, means for controlling the drive ratio established by said gearing including engageable and releasable friction gripping units adapted to be engaged and released, means for actuating one of said friction gripping units including a piston forming with said housing a chamber adapted to receive fluid under pressure, an annular extension formed on said piston on the side of said piston opposite said chamber, an opening through said extension, means on said piston and housing for preventing relative rotation therebetween, a pawl pivotally mounted on said housing and extending through said opening, said pawl being movable to a first position to engage one element of said gearing to prevent rotation of said output shaft and to a second position to release said gearing element to permit rotation of said output shaft.

3. In a transmission of the type having a housing, an input shaft and an output shaft, and including planetary gearing adapted to provide different drive ratios between said shafts, fluid pressure responsive means including fluid servos for controlling said gearing to provide different drive ratios, a member of said gearing fixed for rotation with said output shaft, one of said servos comprising an axially movable piston, an opening through said piston, and a pawl pivotally mounted on said housing and extending through said opening for engaging said member to prevent rotation of said output shaft.

4. In a transmission of the type having a housing, an input shaft and an output shaft supported for rotation in said housing, drive ratio means for establishing different drive ratios between said shafts, including planetary gearing having a ring gear drivingly connected to said output shaft, means for controlling the drive ratio established by said gearing including engageable and releasable friction gripping units operable to be engaged and released, means for actuating one of said friction gripping units including a piston forming with said housing a chamber adapted to receive fluid under pressure, an annular extension formed on said piston on the side of said piston opposite said chamber surrounding said ring gear, an opening through said extension, a park gear on the outer perimeter of said ring gear, and a pawl pivotally mounted on said housing and extending through said opening, said pawl being movable to a first position to engage said park gear to prevent rotation of said output shaft and to a second position to release said park gear to permit rotation of said output shaft.

5. In a transmission of the type having a housing with a rear wall, an input member and an output shaft supported for rotation in said housing, drive ratio means for establishing different drive ratios between said input member and said output shaft including planetary gearing having a ring gear drivingly connected to said output shaft, means for controlling the drive ratio established by said gearing including engageable and releasable friction gripping units operable to be engaged and released, means for actuating one of said friction gripping units including a fluid receiving chamber in the rear wall of said housing and a piston reciprocably mounted in said chamber, an annular extension formed on said piston opposite said rear wall surrounding said ring gear, an opening through said extension, a park gear formed on the outer perimeter of said ring gear, a park pawl pivotally mounted on said housing having a finger portion extending through said opening, and means for engaging and disengaging said finger portion with said park gear for preventing rotation of said output shaft when said finger portion is engaged.